United States Patent Office 3,475,375
Patented Oct. 28, 1969

3,475,375
NOVEL AMORPHOUS GUANIDINE SILICATES, AND COMPOSITIONS THEREOF WITH SYNTHETIC RESINS
Paul C. Yates, Wilmington, Del., assignor to E. I. du Pont de Nemours and Company, Wilmington, Del., a corporation of Delaware
No Drawing. Continuation-in-part of application Ser. No. 648,216, June 23, 1967. This application Mar. 25, 1968, Ser. No. 715,556
Int. Cl. C08k 1/500; C07f 9/06
U.S. Cl. 260—59
5 Claims

ABSTRACT OF THE DISCLOSURE

The present invention relates to compositions of matter containing as an essential ingredient, stable, non-crystalline guanidine silicates having a molar ratio of guanidium ions to silicate ions of from 1.5 to 0.65. These compositions are characterized by the fact that they are amorphous and soluble in water, giving aqueous solutions which may be highly concentrated. The dried or dissolved materials are used as adhesives, binders, and film-forming agents. These guanidine silicates are prepared by bringing together a source of guanidinium ions and colloidal silica under closely controlled reaction conditions. Close process control is necessary to produce the novel amorphous compounds of this invention.

BACKGROUND OF THE INVENTION

This application is a continuation-in-part of copending application Ser. No. 648,216, filed June 23, 1967, and now abandoned.

The present invention relates to guanidine silicates. The novel compounds of this invention are characterized in that they are amorphous and highly water soluble. Alkali silicates either alone or in combination with other materials have been used for some time as binders for sand and other refractory materials in casting processes, as adhesives, as film-forming agents and in coatings. In the past, alkali metal silicates have been used for most of the above applications where soluble, basic silicate was required, however, difficulties associated with the removal of the alkali metal component have prevented their widespread acceptance. A basic silicate combining the desired properties of water solubility and easy removal of the cation component has been sought for many applications.

It has now been discovered that silicates of the organic base guanidine can be prepared in an amorphous, highly soluble form. Guanidine silicates are known to the art. However, the only known guanidine silicates are crystalline materials having very limited water solubility. Such crystalline guanidine silicates and processes for their preparation are disclosed in U.S. Patent 2,689,245 to Reynold C. Merrill.

SUMMARY OF THE INVENTION

According to this invention, amorphous guanidine silicates having exceptionally high water solubility well in excess of 15% by weight of silica in the solution have been discovered along with processes for their preparation. The guanidine silicates of the invention have a molar ratio of guanidinium ions to silicate ions of from 1.5 to 0.65. These compositions are completely amorhpous, failing to reveal any crystalline structure even on microscopic or X-ray examination.

The compositions of this invention differ from those of the prior art in that they are of the order of a thousand times more soluble in water than the crystalline guanidine silicates of similar mole ratio previously described, and may be prepared in highly concentrated solutions. The previously known crystalline compounds resist all attempts at concentration. They recrystallize out making it impossible to maintain solutions at ambient temperature having other than low silica concentrations.

The novel guanidine silicates of this invention may be prepared by processes which in general comprise contacting a source of guanidinium ions with colloidal silica at a high pH, a low temperature, and in the presence of closely controlled relative amounts of guanidine and silica. The reaction must be closely controlled and variables such as the concentration of reactants, time, temperature and pH are critical and must be carefully maintained as will be described more fully hereinafter in order to achieve the preparation of these amorphous, soluble compounds.

THE GUANIDINE CATION

The usual source of the guanidine cation is guanidine hydroxide.

Guanidine hydroxide may be prepared by techniques known to the art or by the adaptation of techniques which have been employed to prepare free hydroxides of other strong organic bases. For example, guanidine hydroxide can be prepared by the precipitation of calcium carbonate from solutions of guanidine carbonate by the addition of lime, by precipitation of barium sulfate from solutions of guanidine sulfate by the addition of barium hydroxide, the precipitation of silver chloride from guanidine chloride by the addition of freshly precipitated silver oxde or ammoniacal silver hydroxide, as well as precipitations employing the iodide or bromide of guanidine. Solutions of guanidine hydroxide may also be prepared by deionization of a soluble guanidine salt employing the hydroxyl form of a strong basic ion-exchange resin.

SILICA SOURCES

A variety of sources of silica may be employed in the processes of the invention. These include precipitated gels and powders of colloidal amorphous silica having surface areas in excess of 20 m.$^2$/g. and preferably in excess of 100 m.$^2$/g. They also include colloidal sols of amorphous silica having the same surface areas.

Such sols, powders, gels and precipitates can be prepared in a variety of ways well known to the art. These include precipitation of solutions of alkali metal silicates with acids; followed by washing to obtain a high surface area silica gel; oxidation or hydrolysis of silicon tetrachloride; and the controlled polymerization and growth of colloidal amorphous silica particles from solutions of silicic acid or higher surface area silica sols. High surface area amorphous silica residues may also be prepared by acid leaching clay minerals, such as magnesium or aluminosilicate minerals, as well as by a variety of other techniques which are known and practiced in the art.

Alternatively, solutions of silicic or polysilicic acids may be employed as the siliceous raw materials. These include, for example, solutions prepared by the neutralization of dilute solutions of alkali metal silicates with acids, followed by purification to eliminate the metal salts produced by the neutralization. Solutions of silicic acid prepared by the deionization of alkali metal silicates with cation exchange resins in the hydrogen form, and solutions prepared by the hydrolysis of silicate esters such as ethyl orthosilicate can also be used. It is only necessary that such silicic acid solutions have a very limited stability, since their rate of reaction with guanidine hydroxide to form guanidine silicates is quite rapid.

Silica sols suitable as reactants may also be prepared from silicon metal. For example metallic silicon may be reacted with concentrated aqueous ammonia solutions or aqueous solutions of amines. In addition, metallic silicon and certain silicon metal alloys are also useful directly, as sources of silica, in which instance the reaction to form the active form of silica and the reaction to form the guanidine silicate compositions of this invention from such raw materials occur almost simultaneously. For example, solutions of guanidine hydroxide may be reacted with finely divided silicon metal.

Alternatively, guanidine cations can be formed "in situ" and reacted with silicate anions at the moment of their generation to form the compositions of this invention in a single step. The guanidine form of a cation exchange resin can be prepared by contacting the hydrogen form of the resin with guanidine hydroxide or guanidine carbonate.

Thus, a guanidine cation exchange resin can be reacted with an alkali metal silicate solution having mole ratios of metal cation to silica between 1.5 and 0.65 directly to generate the compositions of the invention in a single rapid operation.

Also, solutions of guanidine carbonate could be reacted with a suspention of a calcium silicon alloy, again observing the relative proportions of the guanidine carbonate and calcium silicon alloy to obtain a guanidine silicate and calcium carbonate as products. After the reaction, the product would be separated from the insoluble calcium carbonate by filtration.

THE REACTION

A most critical aspect of the process required to obtain the products of the invention is close control of the relative proportions of the reactants. Close control must also be exercised over reaction conditions. It is critical for the successful operation of the processes of this invention, and to obtain the products thereof, that the mole ratios of guanidine hydroxide to silica in the reacting solution fall within the limits of from 1.5 to 0.65.

When mole ratios of guanidine to silica higher than 1.5 are employed, water-insoluble crystalline guanidine silicate precipitates are formed at relatively low concentrations of silica. It seems possible that such silicates may contain direct silicon to nitrogen bonds, or perhaps a multiplicity of such bonds. In any event, these crystalline, water-insoluble silicates are always obtained at low silica concentrations when mole ratios of guanidine to reactive silica higher than about 1.5 to 1 are used.

When mole ratios of guanidine to silica less than 0.65 are used, undesirably rapid increases in the viscosity of the resulting solutions occur.

When the mole ratio of guanidine to silica is below 0.65, and especially if highly reactive sources of silica such as silicic acid or polysilicic acid are used, it is possible to obtain relatively concentrated, although highly viscous, metastable solutions as a result of the initial interaction between the guanidine hydroxide and reactive silica. When less reactive forms of silica such as colloidal silica sol particles or silica gel particles are used at these mole ratios, the excess silica initially fails to react. When it finaly does react, gels and solutions of excessively high viscosity are obtained.

Solutions having below 0.65 mole of guanidine per mole of silica are not indefinitely stable, and the stability upon storage is a function of both the mole ratio and the solids concentration. In some circumstances, it is useful to have a material which has a lower mole ratio than 0.65 and these may be prepared but they have only a limited stability of from a few hours to about a week. In such circumstances, it is possible to prepare materials having ratios lower than the recommended lower limit, and these may be employed so long as stability is not a critical factor. However, below 0.5 mole of guanidine per mole of silica, it is not possible to prepare even temporarily, a clear ionic solution of guanidine silicate.

A second critical factor in the operation of the processes of this invention, and for obtaining the novel products thereof, is a close control over the time and temperature conditions for conducting the reaction between the source of guanidine hydroxide and the source of active silica. The time required depends both on the temperature and on the relative reactivity of the source of silica employed. For example, if silicic acid or very low polymers of silicic acid are used as the reactive silica source, extremely short reaction times at room temperature are sufficient to prepare the guanidine silicate compositions of the invention. With less reactive silica sources, such as silica sols and silica gels and powders, reaction times are longer and become undesirably long at room temperature for the lower surface area sources. Thus, reaction times as long as from 6 to 24 hours or even longer may be required at room temperature and below when using the less reactive forms of silica.

These times may be shortened by rasing the temperature of the reaction, but caution must be employed that it is not too high and especially that the reaction mass does not remain at high temperatures over extended periods of time. This is because the guanidine cation itself is subject to a hydrolysis reaction at elevated temperatures, wherein it is first hydrolyzed to urea and ammonia, and is ultimately hydrolyzed to ammonium carbonate. For this reason, it is undersirable to employ reaction temperatures above 100° C. The preferred range is 25° to 95° C. It is also undesirable to run the reaction temperatures below 25° C. because of the possibility of forming crystalline guanidine silicates which will precipitate as highly water insoluble compounds.

Even with the least reactive of the silica raw materials, reaction times at this temperature are seldom in excess of a few minutes.

The time of reaction follows an inverse relationship to the temperature, and is also directly related to the reactivity of the silica raw material employed. As previously noted, monomeric silicic acid and low polymers of silicic acid react very rapidly even at room temperatures, wheras reaction times of the order of an hour are required with the less reactive silica sources at temperatures in the neighborhood of 75° C.

The proper pH for formation of the soluble guanidine silicates of this invention is in excess of 10.5, and preferably in excess of 11. Guanidine hydroxide solutions which are sufficiently dilute to give pH values lower than this do not give satisfactory products. Below pH 11, rates of reaction are considerably slower than are desired, particularly when employing amorphous silica sols or powders as raw materials.

Solutions of guanidine hydroxide have only a limited stability. This stability is determined both by the temperature and by the concentration of guanidine hydroxide. If highly reactive solutions of silica are used such that temperatures of the reaction are low and reaction times are short, it is possible to use solutions of guanidine hydroxide containing up to 60% by weight. It is desriable to store very concentrated solutions of guanidine hydroxide at a temperature near 0° C. to minimize decomposition of guanidine. When less reactive sources of silica are used which require higher reaction temperatures, it is desirable to use less concentrated solutions of guanidine hydroxide as a reactant. Solutions containing about 30% by weight of guanidine hydroxide are relatively stable for periods of time of a few hours and those of 10% or less for 24 hours or more. Solutions of about 10 to 40% concentration are preferred, and these hydrolyze only to a negligible degree within the required reaction time of even the least reactive of the silica sources to be employed as raw materials.

THE PRODUCTS

The products of the above-described reaction are non-crystalline (amorphous) guanidine silicates. They can be prepared at concentrations in excess of 15% by weight of silica in solution, and these solutions are generally quite stable for indefinite periods of storage. Solutions which are more dilute in silica than this are stable for reasonable periods of time, but if the silica content is in the neighborhood of only 5 to 6% by weight, there is a tendency over a period of time to precipitate water-insoluble crystalline guanidine silicates from such compositions. This may be due to the formation of polymeric species of silicic acid and guanidine, but in any event, it can be avoided by concentrating to silica concentrations in excess of 15% by weight of the total solution with concentrations in excess of 20% being preferred. Maximum stability occurs at mole ratios above about 0.83 with mole ratios of 1 to 1 being preferred.

Concentration is accomplished in a variety of ways known to the art for concentrating stable ionic salt solutions; for example, by reverse osmosis, by evaporation, by vacuum evaporation, by ion exclusion, and by other techniques normally employed for such purposes. It is critical, however, that the temperature not exceed 75° C. for any prolonged period of time while such concentration is being performed. More satisfactory results are obtained when the temperature does not exceed 50° C. The most preferred technique is that of vacuum evaporation at temperatures below 50° C.

Due to the exceptional water-solubility of these non-crystalline guanidine silicates, there appears to be almost no practical upper limit to the concentration of solutions which may be prepared from them. If, for example, a reasonably fluid material such as a 60% solids composition containing about 30% silica and having a 1 to 1 mole ratio of guanidine to silica is concentrated further by vacuum evaporation below 50° C., the viscosity increases in a regular fashion to form first a viscous syrup, then a syrup of heavier consistency which can be spun into fibers, and finally without any precipitation or clearcut transition, the compositions are converted to a glassy, water-clear, solid film. These compositions can be redissolved in water instantly, to reconstitute the solutions of the invention. Solutions of these amorphous guanidine silicates can be evaporated to dryness to yield optically clear, glassy films. No crystallinity is discrenible in the films either on examination with a microscope or by X-ray techniques.

As it will be more fully described hereinafter, one of the aspects of this invention lies in the combination of guanidine silicate in stable mixtures with alkali metal slicates such as sodium silicate, potassium silicate, and lithium silicate. These compositions can be formed simply by mixing the solutions of the two silicates. They can be dried to form hard, clear, adhesive films which can be heated to a sufficient temperature to induce the decomposition of the guanidine ion and achieve very useful results. If this heating is done rapidly, the viscous, impervious silicate mass will spontaneously foam to give inorganic foamed structures which are useful as insulation. This foaming property is very useful when such mixtures are employed as binders in fire retardant intumescent paints. Alternatively, if the heating is done sufficiently slowly and decomposition products of the guanidine cation escape from the film by diffusional processes without forming macroscopic bubbles of gas, it is possible to convert such films into dense, water-insoluble masses which have considerably higher silica to alkali metal cation ratios than the alkali metal silicates themselves. Such films and adhesive compositions are much more water resistant than the corresponding unmodified films containing the alkali metal silicates alone, and also have considerably higher melting points and softening points than do the alkali metal silicates. For this reason, they form much more satisfactory high temperature bonding agents and superior cements, film-forming agents and binders than do the alkali metal silicates in various types of applications where water-resistance or thermal resistance are important use characteristics. This includes such uses as refractory binders for magnesium oxide, amorphous silica, clay minerals, alumina, and the like, uses as binders for zinc-rich paints, uses as adhesives for boxboard applications, and uses as binders and adhesives for roofing granules.

There are no critical compositional limits on the mixtures of guanidine silicate and alkali metal silicates. The proportions will depend on the properties desired in the mixture which will depend on the application. As a practical matter, 5–95 mole percent of alkali metal silicate in a mixture will be preferred for most applications. Further compositions of this invention are mixtures of guanidine silicate in various proportions with dispersions of colloidal amorphous silica. While such mixtures are not indefinitely stable, they represent highly useful aspects of the compositions of this invention, and they are sufficiently stable to give working lives of from a few minutes to several days depending on the relative proportions of the ingredients and other factors, which will be discussed below.

The prior art is familiar with a wide variety of colloidal amorphous silica dispersions in water. Such dipersions generally range in concentration from approximately 5% $SiO_2$ to 70 or 80% $SiO_2$ and in particle size from a diameter of about 1 millimicron to a diameter of about 500 millimicrons. These dispersions can be prepared by a variety of techniques, including the oxidation of silicon tetrachloride with gaseous oxygen, followed by suspending such particles in water. Stable colloidal dispersions of amorphous silica may also be prepared by the controlled polymerization and growth in aqueous solution to give spherical, dense amorphous silica particle dispersions having particle sizes ranging throughout the limits discussed above. Similar sols may be prepared by the reaction of very finely divided silicon metal with ammonia or amines, as well as by the deionization of alkali metal silicates to give reactive silicic acid which can then be nucleated and polymerized to give dispersions of a variety of sizes. Particles of the type discussed here may also be prepared by vaporizing and condensing silica in an arc or by the hydrolysis of silicon tetrachloride in the vapor phase, as well as by the decomposition of clay minerals, such as by acid leaching of a mineral silicate. Such colloidal amorphous silica sols may consist of discrete spherical particles, or may, particularly if formed from the clay minerals, have a variety of shapes which are determined by the nature of the mineral employed and the conditions of decomposition of it. Such particles may exist either as discrete units or as aggregates. Dispersions of colloidal silica are normally prepared and stabilized in aqueous solution by the addition of a sufficient amount of alkaline material to maintain the pH of the dispersion within the range of 9 to 10.

There are two interesting variants in the type of compositions which can be prepared by mixing colloidal amorphous silica dispersions with the guanidine silicate compositions of this invention. If a colloidal amorphous silica dispersion is mixed directly into the guanidine silicate compositions of this invention, it will first be noted that the solutions appear to be completely compatible and remain clear, except for the slight turbidity associated with the amorphous silica constituent. As more of the amorphous silica is introduced, a highly thixotropic solution results, and if still larger quantities of amorphous silica are introduced, the composition forms a rigid gel. These highly thixotropic mixtures are quite useful as binders for dipping and coating compositions, since relatively thick sections can be applied by spraying, dipping or painting on vertical surfaces and will remain on such surfaces indefinitely without running off. By reversing the order of mixing, it is found that initially, again, a considerable quantity of concentrated guanidine silicate can be introduced into concentrated colloidal amorphous silica dispersions until a third of the total silica concentration in such a mixture is composed of silicate anions from the guanidine silicate. At this point, a very viscous and thixotropic mixture starts to form, as when the order of addition is reversed.

It is possible, however, to prepare fluid, relatively clear compositions having a ratio of silica from guanidine silicate and silica from a colloidal silica sol within the range where thixotropic mixtures or gels are normally firmed. This can be done by adding an amount of a strong base (which can be an alkali metal hydroxide or guanidine hydroxide) just sufficient to provide approximately one alkali metal or guanidine cation for each surface silanol group on the colloidal amorphous silica particles. The number of such groups can be determined by a measurement or an estimation of the particle size along with the concentration of the amorphous silica. Alternatively, it can be determined by a measurement of the surface area of the particles, such as by nitrogen adsorption.

Thus, if relatively fluid, reasonably stable mixtures are desired throughout the whole range of combined proportions, this may be done by adding an amount of alkali as indicated above to the colloidal amorphous silica dispersion, and then adding this dispersion to the concentrated guanidine silicate. Such compositions are exceptional binders. They also form strong and hard films and adhesives, and have a variety of specific uses which will be discussed in greater detail subsequently.

The proportions of quanidine silicate to colloidal amorphous silica in these mixtures is not critical, but suitable proportions will be readily determinable by one skilled in the art based on the properties desired. The preferred range would be a mixture containing from 5–99.5 percent by weight of colloidal silica particles based on the total solids present. Even very small quantities of guanidine silicate can, however, bring about extensive changes in the properties, behavior, and usefulness of amorphous silica dispersions. For example, even a few one hundredths of one percent of guanidine silicate can greatly accelerate the rate of gel formation of amorphous silica dispersions when these are neutralized with acids. The strength and pore size distributions, as well as the uniformity of such gels, are also greatly different from those obtained in the absence of guanidine silicate. Such compositions are particularly useful as refractory binders for molds for casting molten metals, for bricks to be used in steel furnaces, and as high temperature catalyst binders. The complete absence of metal cations leads to exceptional refractory properties in such uses.

Still another useful and novel aspect of the compositions of this invention is mixtures of guanidine silicate with formaldehyde or water-soluble organic molecules having a multiplicity of functional groups which are capable of reacting with the guanidine cation of the compositions of the invention by condensation or addition reactions to form polymeric materials. Structurally, such polyfunctional organic compounds may be represented by the generic formula $R_1(C)_nR_2$, where $R_1$ and $R_2$ are selected from the group consisting of carboxyl, hydroxy, amino, aldehyde, ketone of the formula

where $R_3$ is methyl or ethyl and terminal carbon-carbon double bonds, where $n$ is two or greater, with the proviso that when one R is a double bond the other R is nitrile or one of said other mentioned substituents. Thus, one of the series of novel compositions of this invention is a mixture of amorphous guanidine silicate with from 5 to 95 mole percent of a polyfunctional soluble organic compound such as is described herein.

Structurally, the guanidine cations of the invention are diamides and are capable of undergoing all of the polymerization and addition reactions characteristic of this type of functional group. They may, for example, react with dibasic acids or with their amides, with the elimination of water or of ammonia to form polyamides, or with dibasic acid esters with the elimination of volatile alcohols to form polyamides. The amide hydrogens on guanidine are also sufficiently reactive to add rapidly across activated carbon-carbon double bonds and to aldehydes and ketones. For example, formaldehyde adds to guanidine to form mono-, di-, and trimethylol derivatives which are analogous to the mono-, di-, and trimethylol ureas, and which, upon heating will undergo additional polymerization and condensation reactions to form three-dimensional guanidine-formaldehyde resins which are quite similar to urea-formaldehyde resins.

Guanidine reacts by addition polymerization with activated carbon-carbon double bonds in compounds such as acrylonitrile, acrylic and methacrylic acid and the corresponding esters and amides of these. Upon heating in aqueous solution, the nitrile group, or amide or ester groups are hydrolyzed and converted into an acid, which then can be polymerized through the condensation of water to give a polyamide polymer. Similar condensation reactions can occur between the silanol groups of the silicic acid anions and the amide groups of guanidine, as well as between silanol groups on adjacent silicic acid anions. Such condensation and crosslinking reactions may also occur between silanol groups and hydroxyl, amido, or ester groups which are attached to the polyfunctional organic compounds. Through the simultaneous condensation polymerization of guanidine with such reactive organic compounds, of guanidine with the silanol groups on the silicic acid anions, and between the silanol groups of the silicic acid anions and the reactive functional organic compounds, complex three-dimensional polymers having a range of properties may be prepared. Such compositions are usually water-insoluble and the addition of these polyfunctional organic compounds therefore comprises one way of achieving water-insoluble films or bonded structures starting with guanidine silicate.

The most preferred polyfunctional reactive compounds are those which have an appreciable water-solubility and which can be prepared as homogeneous solutions when mixed with the guanidine silicate compositions of the invention. Compounds such as acrylonitrile, polyacrylamide, maleic acid, and trimethylolurea, all of which possess relatively high water-solubility, are some of the preferred organic compounds for preparing this aspect of the compositions of the invention. Ternary mixtures of guanidine silicate with colloidal amorphous silica and reactive polyfunctional organc compounds are also preferred compositions of this invention.

The compositions of this invention are useful in a wide variety of applications such as binding agents, film-forming agents, and adhesives. In many applications they perform in a unique way not common to any known binder composition of the prior art.

A specific example is the use of concentrated guanidine silicate compositions or mixtures thereof with reactive polyfunctional organic molecules as binders for sand cores which are employed to create shaped cavities in castings prepared from molten metals. The most widely used polyfunctional organic binders currently available for this purpose are organic resins, such as phenolformaldehyde resins, furfural resins, furfural-phosphoric acid resins, and furfural-urea formaldehyde resins. The amount of resin used is about 20 to 80 percent by weight based on the weight of the total binder solids.

Such organic resins alone form well-bonded sand cores, and are particularly desirable because the bond is completely decomposed by the high temperatures prevailing in the casting operation shortly after the metal casting has solidified. It is thus possible to easily remove the loose sand from which the fugitive binder has escaped when the casting operation has been completed.

Unfortunately, however, these resinous compositions require relatively elevated temperatures to develop satisfactory bonding strength. This necessitates the use of expensive metal patterns and complex hot core boxes to prepare the resin-bonded sand cores. A further disadvantage is that during the process of heating the core to cure the resin bond, undesirable dimensional changes arise as a result of the differing coefficients of thermal expansion between the resin, the sand, and the patterns.

A different class of core bonding agents which avoid some of the problems associated with resin bonded cores are the alkali metal silicates. For example, if sand is moistened with concentrated sodium silicate solutions, and packed into the desired shape, it can then be set rapidly at room temperature by exposure of the moistened sand body to gaseous carbon dioxide. In this way, inexpense patterns of wood, rubber or plastic may be employed instead of the more expensive metal patterns required for resin bonded cores, and simple wooden boxes may be substituted for the expensive and complex hot core boxes. Dimensional changes are virtually eliminated since the curing of the composition occurs at the same temperature as that prevailing during the assembling of the core. In spite of its advantages, however, sodium silicate bonded cores have been employed only to a minor degree by the casting industry because of several serious defects. The most serious of these is that sodium silicate cores do not disintegrate upon exposure to higher temperatures and consequently the cores are exceedingly difficult to remove from the cavity in the casting. A further problem is that such cores remain quite strong and rigid at high temperatures where the metals are relatively weak. Thus, as the temperature drops, and as the metal contracts and shrinks due to its high coefficient of thermal expansion, the metal often tears or cracks when thin sections of the metal are located in areas where the contraction of the metal is constrained by the core configuration. This is not a serious problem with resin bonded cores, since after the binder has decomposed the contracting motion of the metal can be accommodated by deformation of the core. In sodium silicate cores, however, the core does not deform and the metal often tears.

Guanidine silicate may be used in a fashion substantially identical to that described above for sodium silicate. A striking property exhibited by the compositions of this invention is that concentrated guanidine silicates set rapidly at room temperature upon exposure to $CO_2$ in a fashion exactly analogous to that of sodium silicate. However, as a result of the complete decomposition of the guanidine cation when the bonded core is exposed to the high temperatures prevailing in the casting operation, guanidine silicate bonded cores decompose to give a free-flowing sand exactly analogous to organic resin-bonded cores. Thus, guanidine silicate seems to simultaneously exhibit the best characteristics, and to avoid the worst problems, associated with previous core binding materials known to the art. Similar behavior is also exhibited by the guanidine silicate-reactive polyfunctional organic compound compositions of the invention, and, in certain instances, these may even be superior to guanidine silicate alone in this application, since the polymers so formed decompose more slowly and at higher temperatures than does the guanidine cation itself. This is sometimes desirable when it is required that the bond in the core disappear at a slower rate or be maintained at a higher temperature than is obtainable with pure guanidine silicate.

Another unique application of the compositions of this invention is in the spinning of ceramic fibers. The prior art has long sought satisfactory processes for preparing refractory ceramic fibers such as amorphous fused silica fibers, fibers of zircon, aluminosilicate fibers, and others. The difficulties associated with preparing such fibers can be illustrated by the procedures which the prior art has employed to prepare relatively pure amorphous silica fibers. Because of its very high melting point, in excess of 1600° C. and the very high viscosity of fused silica glass, it is exceedingly expensive and very difficult to spin such fibers from a melt. In one procedure, fibers of boric oxide and silica which have lower melting points and lower viscosities have been spun from melts, and the boric oxide then leached out by prolonged treatment with aqueous acidic solutions. The multiplicity of fine pores created by the loss of the boric oxide constituent are then partially closed by heating and annealing treatments. Other approaches in the art have been to spin fibers from aqueous alkali metal silicate solutions and leach out the alkali metal oxides with acid. All such processes have been expensive because of the long times required to leach out the undesirable constituents such as boric oxide or alkali metal cations.

The concentrated guanidine silicate compositions of this invention, along with concentrated mixtures of these with colloidal amorphous silica dispersions, are viscous and thixotropic, and behave excellently in spinning operations. Individual fibers can be drawn from a viscous solution by usual spinning techniques. Such fibers, once spun, have the unique advantage over prior art techniques of making fibers in that they can be converted into pure amorphous silica glasses, simply by heating. At temperatures in the neighborhood of 300° C. and higher the guanidine cation thermally decomposes, the gases are liberated, and a chemically pure amorphous silica refractory fiber can be prepared. By intermixing such compositions with alumina, zirconia, and other refractory glass-forming oxides, it is possible to prepare a variety of very high melting ceramic fibers employing inexpensive, low temperature spinning equipment. Then, by simply heating the already formed fiber to a sufficiently high temperature to decompose the guanidine cation and densify the resulting fiber, dense refractory oxide fibers can be prepared. If the heating operation is very fast, the gas created by the decomposition of the guanidine cation can lead to the formation of a foamed fiber structure which is of exceptional value for its insulating characteristics. If a dense fiber is desired, the heating can be done at a sufficiently slow rate that the gaseous decomposition products of guanidine may be eliminated by diffusional processes without the formation of macroscopic bubbles.

Another useful characteristic of the guanidine silicate compositions of the invention is that the guanidine cation can be slowly decomposed by heating in water at temperatures above 75° C. The hydrolysis of the guanidine cation leads first to the formation of urea and later to the formation of ammonium carbonate. This allows guanidine silicate solutions to be employed as unique silica coating reagents. If it is desired to coat a solid material with a thin amorphous silica coating, this can be done simply by contacting it or suspending it in a guanidine silicate soluton and by heating the resulting solution.

For example, silica-coating titanium dioxide in order to minimize its reaction with organic materials such as nylon, can be done by suspending the titanium dioxide pigment in a dilute solution of guanidine silicate and boiling until the decomposition or the guanidinium ion has been completed. As the guandine ion decomposes, reactive amorphous silica is released and is deposited on the solid substrate in the form of a dense, amorphous silica layer, In contrast to silica coating operations with other reagents such as by acid neutralization of alkali metal silicates, there are no impurities remaining as non-volatile contaminants in such silica coating operations. It is therefore not necessary to wash, to deionize, or to otherwise purify the product other than by drying, since the ammonium carbonate which is formed as a byproduct of the hydrolysis of guanidine silicate is completely volatile on drying, and simply disappears from the product.

The same freedom from non-volatile impurities can be employed to give exceptionally pure and reactive catalytic materials. For example, it is known in the art that sodium ions are serious poisons for aluminosilicates when these are used as cracking catalysts. Exhaustive washing and other purification techniques are therefore necessary when cracking catalysts are prepared from alkali metal silicates. This is completely unnecessary using the novel guanidine silicates of the invention, since the guanidine ion may either be decomposed by hydrolysis upon heating in aqueous solution, or by firing at relatively low temperatures. Thus, the guanidine silicates of this invention are unique materials for preparing zeolytes, aluminosilicate catalysts, and when used as catalyst binders in a variety of applications where alkali metal cations are undesirble impurities.

When the compositions of this invention are employed as binders for refractory inorganic materials such as amorphous silica grain, zicron, asbestos, fiber glass, aluminosilicates, alumina, magnesia and the like, it is possible to prepare a variety of dense, hard, strong, tough ceramic-like materials possessing very high temperature resistance, exceptional strength, and yet which may be dried or cured at temperatures far below those which are commonly required to obtain ceramic-like masses. Useful results are obtained with as little as 1% $SiO_2$ from guanidine silicate on a solid basis. Between 3 and 25% are most preferred.

Specific examples of the use of guanidine silicate compositions of the invention, the guanidine silicate-amorphous silica compositions of the invention, and the guanidine silicate-reactive polyfunctional organic compound compositions of the invention, as well as mixtures of these with one another as binders to prepare such bodies will be described in greater detail in the examples.

Compositions of this type may be used to form massive bonded bodies as when guanidine silicate is employed as an adhesive and bonding agent for magnesium oxide brick, they may be employed to form hard, thin strong coatings and films, and they may be employed to form molding compositions capable of being shaped by slip-casting, compression molding, injection molding, and a variety of other fabrication processes into desired forms and configurations.

There are a variety of other possible uses for the compositions of this invention such as adhesives, fire retardants, binders, and coating compositions which may be applied to the surface of metals, glass, ceramics, wood and plastic. They may also be employed as binders for fibrous or particulate materials of almost any sort.

The guanidine silicate compositions could also be used for the consolidation of said in oil drilling operations. Such a method of consolidation with other silicate materials is described in U.S. Patent 3,175,611. The use of guanidine silicates would give a porous sand consolidation that is inert to water, brine and oil. The guanidine silicate could be easily decomposed at moderate temperatures to bond the sand while giving off urea and gaseous ammonia which would act as a blowing agent to give the necessary porosity. If greater porosity is needed, additional reactants could be added, e.g., a hypochlorite, to cause a secondary gas forming reaction.

The mixtures described herein are useful as solids or in solution form, depending on ease of handling and the particular application. In the solutions, the percentage ranges referred to are based on the weight of total solids unless otherwise expressed.

The following examples are given by way of illustration of the invention.

EXAMPLE 1

Seven-thousand-fourteen grams of guanidine carbonate is dissolved in 28 liters of distilled water in a stainless steel tank equipped with an air stirrer. Three-thousand-fourteen grams of calcium hydroxide is added to the stirred solution and stirring is continued for 14 hours at room temperature. The resulting calcium carbonate is filtered and the filter cake washed with distilled water. The combined filtrate and washings weighed 33,019 grams. A sample of this is titrated to a pH of 7 with 1 normal hydrochloric acid and is found to have a concentration of 1.98 moles of guanidine hydroxide per 1000 grams.

Four-thousand-two-hundred-eighteen grams of a hydrated amorphous silica powder containing 93% $SiO_2$, the balance being water, and having a surface area of 121 m.$^2$/g., is stirred into the guanidine hydroxide solution in a stainless steel tank heated on the outside of the tank with a steam coil. The temperature is raised over a period of 3 hours from 30° C. to 79° C. at which point virtually all of the silica dissolves.

This solution is cooled to room temperature and filtered to remove insoluble material. The filtrate is vacuum concentrated at 35 to 40° C. and a vacuum of 31 inches of $H_2O$ to a total volume of about 12 liters, having a weight of 14,257 grams. Chemical analysis shows it to contain 24.01% $SiO_2$, 5.81% carbon, 18.04% nitrogen. A titration with one normal hydrochloric acid shows it to have a molality of 4.30 in titratable guanidinium ions, in excellent agreement with the results from the nitrogen analysis. The mole ratio of guanidine to silica in this solution is 1.075.

A sample of this solution is dried on a glass plate under vacuum with a nitrogen purge at room temperature, and forms a water-clear, glassy film. This film on analysis is found to contain 37.37% $SiO_2$ and 27.69% nitrogen. This checks very closely with the values of 38.71% $SiO_2$ and 27.10% nitrogen to be expected for a composition having the formula:

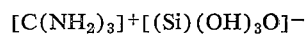

$$[C(NH_2)_3]^+[(Si)(OH)_3O]^-$$

X-ray examination of this material shows it to be completely amorphous. It is also completely soluble in water in all proportions.

EXAMPLE 2

Two hundred grams of guainidine carbonate is slurried in 266 mls. of distilled water and stirred in a one liter, round bottom glass flask to which is added 86 g. of calcium hydroxide. This is stirred at a temperature of 18° C. for 4 hours and the insoluble calcium carbonate washed with 15 mls. of distilled water. The total weight of the filtrate as 274 g. 83.8 of the hydrated amorphous silica of Example 1 is added to 264 g. of this guanidine hydroxide and an additional 50 ml. of distilled water is added while the mixture is heated on a steam bath. Heating is carried on for a 15 minute period, during which time the temperature rises from 30° C. to 95° C. This temperature is maintained for an additional 5 minutes, after which the solution is filtered and cooled to room temperature with an ice bath. Chemical analysis for silica and titration of the composition to determine the guanidine cation concentration indicate that this composition contains 15.42% $SiO_2$ and is 3.55 molal in guanidine cations. The guanidine to silica mole ratio in this composition is 1.375 to 1. This composition, as in Example 1 on evaporation to dryness yields a completely amorphous, completely water-soluble, glassy film.

EXAMPLE 3

This is an example of one of the film-forming reactive organic molecule-guanidine silicate compositions of the invention. Six-tenths of a gram of the 24% $SiO_2$ guanidine silicate aqueous solution prepared as directed in Example 1 is mixed with 1 gram of an 85% solids solution containing urea and formaldehyde in the weight ratios of 60 parts of formaldehyde and 25 parts of urea in the form of their trimethylol derivative. After mixing to give a compatible solution, the product is spread on a black glass plate and dried at 70° C. to give a cross-linked copolymer of silicic acid, urea-formaldehyde, and guanidine which is water-insoluble and quite hard, in distinction to the highly water-soluble films which are formed from drying of guanidine silicate alone under these conditions.

Ten grams of a guanidine silicate-urea-formaldehyde solution as above in the same relative proportions is mixed with 50 grams of a finely divided sand, and this is tamped into the shape of a core in a core cavity. The core is set by exposure to carbon dioxide gas for a period of approximately 30 seconds, after which it assumes a rigid condition and is easily removable from the core cavity. The pattern is then used immediately to form another mold. The core is dried by heating it at 95° C.

for 1 hour in an oven, and is used to create a cavity of the dimensions and shape of the core in a molten metal casting. The binder burns completely out during the casting operation, leaving a loose sand which is easily shaken out of the cavity in the casting.

This exemplifies the use of one of the compositions of the invention to obtain the advantage of sodium silicate-$CO_2$-cores of setting rapidly at room temperature to a hardness sufficient to strip them from the core pattern, and yet burning out to give easily removed sand in a fashion similar to that of organic resin bonded cores.

EXAMPLE 4

Ten grams of the guanidine silicate solution prepared according to Example 1 is mixed with 50 grams of a sized, finely divided core sand, as in Example 3, and this is packed into a core pattern and set with $CO_2$ as described in the same example. The resulting core is employed to produce a shaped cavity having the dimensions and shape of the core in a casting of molten iron, which after solidification shows a complete disintegration of the bond to form loose sand which is easily removed from the cavity in the casting. The sand is reusable to form other cores in a similar type of operation.

EXAMPLE 5

This is an example of the use of one of the guanidine silicate-colloidal amorphous silica compositions of the invention for the purposes of preparing a mold for precision investment casting. In contrast to the two previous examples, where it was desired to have the bond completely disintegrated, in this instance it is desirable to prepare a mold for precision investment casting which maintains its integrity, and it is for this reason that the mixture of colloidal amorphous silica and guanidine silicate is employed in preference to pure guanidine silicate or one of the guanidine silicate-reactive organic molecule compositions of the invention.

One hundred grams of the guanidine silicate aqueous composition of Example 1, containing 24% $SiO_2$ is mixed in a rapidly stirred zone with 56.7 grams of a 49% solids dispersion of spherical colloidal amorphous silica particles having an average particle diameter of 25 millimicrons, along with 19.2 grams of formamide and 20.7 grams of water. This composition is highly thixotropic. The purpose of the formamide is to provide a delayed gelling operation by hydrolysis of the amide linkage and the release of formic acid to neutralize the guandine silicate.

Actually, this mixture is sufficiently thixotropic that the degree of thixotropic viscosity must be reduced and this is achieved by the addition of 10 grams of glycerol.

To this mixture is added 352 grams of a refractory grain amorphous silica, 55% by weight of which was a size fraction which passed a 100 mesh screen, but was retained on a 200 mesh screen, and 45% by weight of which passed through a 325 mesh screen.

The resulting ceramic slip is fluid enough to be easily applied to the surfaces of wax molds, and to accurately conform to the surface shape and patterns on the surfaces of these molds. At the same time, it is sufficiently thixotropic that a wax mold dipped into this solution comes out retaining an immobilized layer from ⅛ to ¼" thick of the slip in the form of a coating which stays in place on the wax surface.

Coatings of this sort are prepared on a variety of wax patterns, and set in an oven at 50° C. which accelerates the previously noted hydrolysis of the formamide and caused the mixture to be converted into a firm silica gel. After curing for an hour at 50° C., the wax is melted out of these patterns with no cracks resulting in the coating, by steaming in a steam bath at a temperature of 90 to 100° C. for a period of about 30 minutes. The molds are then dried in an oven and fired to 1000° C.

The resulting molds are porous, strong, accurate reproductions of the shape of the wax patterns, and are employed as casting molds for molten iron and steel to produce a variety of metallic shapes which accurately retain the dimensions of the original wax patterns. Although the hydrolysis of the formamide in the gel formation of this composition is accelerated in this instance by increasing the temperature to 50° C., a slow neutralization reaction with attendant gel formation occurs even at room temperature. This same composition can therefore be sprayed against vertical surfaces and furnish air drying completely water-insoluble ceramic coatings which are useful as ceramic paints and insulating surfacing materials.

EXAMPLE 6

As further examples of the profound effect of adding guanidine silicate to dispersions of colloidal amorphous silica in respect to accelerating their gel times, it can be noted that with a solution 0.15 molar in sodium chloride, the gel time of a 30% amorphous silica dispersion at pH 6 is approximately 3000 minutes. This amorphous silica dispersion contains an amount of salt in the form of sodium chloride similar to that which would be furnished by the acid neutralization of a composition containing 0.15 normal guanidine silicate.

The gel time of the same concentration of an amorphous silica solution containing 0.15 molar guanidine silicate at the same pH, is 64 seconds, or only one minute. Thus, its gel time is one three thousandths as long as that of an amorphous silica dispersion of the same salt content and pH which contained no guanidine silicate.

In a similar fashion, even if the concentration of guanidine silicate is only 0.075 normal, the gel time is 274 seconds, or approximately 4½ minutes, compared to 7500 minutes for an amorphous silica sol containing the same concentration of sodium chloride, that would be furnished as a guanidine salt by the neutralization of this solution. Here the gel time is changed by more than a thousand-fold by the addition of an exceedingly small amount of guanidine silicate.

It will be noted, for example, in this latter instance, that the silica concentration ascribable to silica coming from the guanidine silicate is only 2.5% of the silica contained in the dispersion in the form of colloidal amorphous silica. Nevertheless, this 2.5% of silica in the form of guanidine silicate is capable of a thousand-fold reduction in the gel time of the mixture.

EXAMPLE 7

One hundred grams of the 24% $SiO_2$ guanidine silicate solution prepared as described in Example 1 is placed in a stirred flask and to this is added 21.2 g. of acrylonitrile. This represents four-tenths of a mole of acrylonitrile, or one mole of acrylonitrile for each mole of guanidine silicate in the solution. This solution is heated with stirring until the liquid layer of acrylonitrile disappears, which occurs at a temperature of approximately 60° C. Simultaneously with the disappearance of the last portion of the acrylonitrile, a copolymer gel of the acrylonitrile and guanidine silicate forms, and analysis indicates the two compositions substantially completely reacted with one another. The resulting polymer is a strong, rigid, three-dimensionally crosslinked interpolymer of acrylonitrile, guanidine, and silica. This polymer is unaffected by firing until a temperature is reached at which the organic materials start to decompose, after which a rigid, strong skeleton of pure silica is left behind.

EXAMPLE 8

Equal weights of the guanidine silicate liquid composition of Example 1 containing 24% $SiO_2$, and of a commercial F grade sodium silicate are mixed giving a stable solution. This is employed as a boxboard adhesive, as a plywood adhesive, and as a bonding agent for roofing granules. In all of these applications the mixture behaves as a very efficient bonding and adhesive agent, and shows a much more water-resistant bond than that obtainable using sodium silicate alone as the bonding agent.

EXAMPLE 9

The equipment required for preparing the refractory brick samples consists of two steel plates 12″ x 12″ x ½″, a mold so constructed to contain the total prepared aggregate and withstand the force (3000 p.s.i.) to produce a finished brick 2″ x 2″ x 9″. The other major piece of equipment required is a hydraulic press capable of exerting at least 27 tons pressure into which the completely assembled mold apparatus can be inserted. Other equipment needed is a bricklayer's trowel, spatulas, mixing box or tray and wrenches.

The mold, as shown, is open on top and bottom with the ½″ steel plate serving as the bottom. The side pieces are 1″ steel and the ends ½″ steel being bolted together with 4⅝″ D hardened steel bolts. These are firmly tightened before any aggregate mix is transferred into the mold.

Preparation of aggregate mix

A quantity of the magnesium oxide aggregate sufficient to produce a brick 2″ x 2″ x 9″ is weighed and transferred to a mixing tray where a predetermined weight of binder material is troweled into it. This is applicable for both dry and/or wet "binders"; however, more mixing is generally necessary with wet binders to accomplish thorough mixing. In this event, the binder should be added in small increments. Water is then troweled into the mix until a damp, but not wet consistency is achieved. The aggregate is then transferred into the mold in several increments, being worked well into corners and sides by "slicing and tamping" with a spatula or other suitable device. When all aggregate mix is in the mold with the surface leveled evenly, the top ramming device is put in place and the complete assembly placed into the hydraulic press. (A.P.H.I. press of 30 tons capacity is used). Pressure is applied and increased to 27 tons where it is maintained until the molded brick will hold the 27 tons pressure for 1 minute.

At this time, the pressure is released and the mold assembly is removed from the press and disassembled. This must be done with care because at this point the bricks are very susceptible to damage.

The finished brick is allowed to cure at room temperature for 24 hrs. after which it is cured at 250° F. for 8 hours. After the 250° F. cure, it is ready for testing for modulus of rupture (of green strength). For a "fired strength" test the brick is fired at 1500° F. for 5 hrs., cooled slowly to R.T., and then tested. This 1500° F. cure is accomplished in the following manner:

Beginning at room temperature, the furnace temperature is slowly increased at a rate of 100° F. every 12 minutes, or 500° F. rise/hour. After it has reached 1500° F. the 5 hour cure time is begun.

For test procedure, refer to ASTM Designation C133-55, Standard Methods of Test for "Cold Crushing Strength and Modulus of Rupture of Refractory Brick and Shapes."

Mixtures of varying amounts of guanidine silicate and MgO are formed and pressed into brick according to the described procedure. After firing at the prescribed temperature and manner the following limits were observed as practical optimum regions for binder (guanidine silicate) and $H_2O$ levels: 3–6% (guanidine silicate) and 3–6% $H_2O$.

Within this region the modulus of rupture for bricks formed with 6% guanidine silicate and 3.75% $H_2O$ was 690 lb. M of R after 1500° F. fire and 960 M of R after 2500° F. fire.

The great advantage in using guanidine silicate as a binder for MgO is that no fluxing agent is present in the binder. At the temperatures which the bricks are fired the guanidine silicate decomposes to leave pure silica which does not act as much of a fluxing agent for MgO as ions from the Group I elements of the periodic chart. The molecular silica is a very good bonding agent.

EXAMPLE 10

A composition having a mole ratio of 0.863 mole of guanidine to one mole of silica and containing a silica concentration of 23.7%, was prepared by the procedure of Example 1, by appropriate adjustment in the molar concentration of guanidine employed.

A series of concentrated guanidine silicates of lower ratios can then be prepared, to illustrate the stability of such compositions.

Four hundred fifty-six grams of the 0.863 mole ratio guanidine silicate are mixed in a high speed laboratory blender with 150 g. of a deionized colloidal silica sol having a concentration of 40% $SiO_2$ by weight which has a surface area of 231 m.²/g. The sol is prepared from a commercially available, alkali-stabilized, spherical amorphous silica sol of 40% concentration by removing the stabilizing ions by contacting the sol with the hydrogen form of a cation exchange resin.

This mixture is then placed on a steam bath, and in about 15 minutes all of the colloidal silica has gone into solution and a water-clear product with no turbidity is obtained. Corresponding to the larger quantity of the acidic silicate anions, the pH of this material is 11.3, compared with a value of 11.8 for the starting guanidine silicate having an 0.863 to 1 mole ratio of guanidine to silica. The calculated guanidine to silica mole ratio of this material is 0.55. It is noted that after three days this material becomes exceedingly viscous and ultimately solidifies into a gel containing a network of white, water-insoluble gel phase.

The above procedure is repeated employing the same guanidine silicate starting material, only the relative proportions in this instance are 600 g. of the starting guanidine silicate and 133 g. of the deionized commercial amorphous silica sol. Again, this material clears up completely after about 15 minutes heating on the steam bath, and this material remains stble for longer period of time than the previous one. It takes about 13 days until the viscosity increases to a point that it can no longer be poured. Even at this stage, the major portion of it is soluble in water, but it is found that within a matter of 2 or 3 hours after dissolving this gelled 40% material to furnish about a 10% solution, a flocculant colloidal white precipitate settles out of solution. The mole ratio of guanidine to silica in this composition is 0.62.

If procedures of these examples are repeated with a further adjustment of the ratio of colloidal silica to guanidine silicate, a material is obtained having a mole ratio of 0.70 of guanidine to silica. This material is stable indefinitely upon storage at room temperatures and undergoes no discernible change even after several months.

EXAMPLE 11

Guanidine silicate by itself is an excellent coating material although it is water sensitive. Stepwise treatment of steel panels first with guanidine silica then with formaldehyde or a difunctional moiety such as maleic acid and heating in an open flame or oven leaves a hard water insensitive coating. A 1 mil wet thickness of a 30% solution of guanidine silicate is applied to a steel panel and allowed to dry. The coating is then covered with a 37% solution of formaldehyde and is heated at 140° C. for ½ hour. The resulting coating is hard, clear, water insensitive, and adheres very well to the steel.

What is claimed is:

1. A composition of matter consisting essentially of amorphous, ionic guanidine silicate, said guanidine silicate having a mole ratio of guanidinium cations to silicate anions of from 1.5 to 0.65 and being soluble in water to the extent of at least 15% by weight of silica from said amorphous guanidine silicate based on the total weight of solution.

2. A composition for use as a binder for refractory particles comprising the composition of claim 1 and from 20-80 percent by weight of an organic binding resin based on the weight of the total binder solids.

3. A composition as described in claim 2 wherein said organic binding resin is selected from the group consisting of phenol-formaldehyde resins, furfural resins, furfural phosphoric acid resins and furfural-urea formaldehyde resins.

4. A composition of matter consisting essentially of a stable, aqueous solution of amorphous guanidine silicate, said guanidine silicate having a mole ratio of guanidinium cations to silicate anions of from 1.5 to 0.65, said solution being characterized in that it contains at least 15% by weight of silica from said amorphous guanidine silicate.

5. A process for the preparation of non-crystalline guanidine silicate compositions characterized by ready-water solubility comprising contacting a source of guanidinum ions with a source of silicate ions, maintaining the molar ratios of guanidinium ions to silicate ions within the range of from 1.5 to 0.65, at a pH between 10.5 and 14 and a temperature of from 25 to 95° C. in aqueous medium for from 10 seconds to 24 hours, followed by concentration.

References Cited

UNITED STATES PATENTS

| | | | |
|---|---|---|---|
| 3,338,901 | 8/1967 | Weldes | 260—268 |
| 3,428,465 | 2/1969 | McLeod | 106—38.35 |
| 2,224,815 | 12/1940 | Glycofrides | 260—37 |
| 2,689,245 | 9/1954 | Merrill | 260—247 |

WILLIAM H. SHORT, Primary Examiner

HOWARD SCHAIN, Assistant Examiner

U.S. Cl. X.R.

106—15, 38.22, 38.35, 55, 57, 58, 59, 67, 69, 72, 75, 300, 308; 117—100, 121, 137, 132, 135.1, 169, 137; 252—8.1, 8.5, 426, 449; 260—29.2, 29.3, 29.4, 37, 38, 39, 67, 68, 70, 72, 448.2; 264—41, 56, 63, 330, 331.